(12) United States Patent
Thorpe et al.

(10) Patent No.: US 8,494,307 B2
(45) Date of Patent: Jul. 23, 2013

(54) METHOD AND APPARATUS FOR DETERMINING MISALIGNMENT

(75) Inventors: Jonathan Richard Thorpe, Winchester (GB); Sarah Elizabeth Witt, Winchester (GB)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 13/024,907

(22) Filed: Feb. 10, 2011

(65) Prior Publication Data

US 2011/0211751 A1    Sep. 1, 2011

(30) Foreign Application Priority Data

Feb. 26, 2010 (GB) .................................. 1003289.4
Feb. 26, 2010 (GB) .................................. 1003291.0
Apr. 9, 2010 (GB) .................................. 1005989.7

(51) Int. Cl.
*G06K 9/32* (2006.01)
(52) U.S. Cl.
USPC ........... 382/294; 382/151; 382/154; 382/289; 382/295; 382/296; 382/298
(58) Field of Classification Search
USPC ................ 382/151, 154, 276, 282, 287, 289, 382/293–298
See application file for complete search history.

(56) References Cited

U.S. PATENT DOCUMENTS

| 6,191,809 | B1 * | 2/2001 | Hori et al. ....................... 348/45 |
| 6,385,334 | B1 * | 5/2002 | Saneyoshi et al. ............ 382/154 |
| 6,674,892 | B1 | 1/2004 | Melen |
| 7,113,632 | B2 * | 9/2006 | Lee et al. ....................... 382/154 |
| 7,308,157 | B2 * | 12/2007 | Safaee-Rad et al. .......... 382/294 |
| 8,036,491 | B2 * | 10/2011 | Matsui et al. .................. 382/294 |
| 2004/0057612 | A1 | 3/2004 | Tabata |
| 2007/0165942 | A1 * | 7/2007 | Jin et al. ......................... 382/154 |
| 2009/0041336 | A1 | 2/2009 | Ku et al. |
| 2009/0060290 | A1 * | 3/2009 | Sabe et al. ..................... 382/118 |
| 2009/0128621 | A1 | 5/2009 | Passmore et al. |

FOREIGN PATENT DOCUMENTS

| EP | 0 829 171 A1 | 3/1998 |
| EP | 0 942 610 A2 | 9/1999 |
| EP | 0 981 912 A1 | 3/2000 |

(Continued)

OTHER PUBLICATIONS

United Kingdom Search Report issued Jun. 15, 2010, in United Kingdom 1005989.7, filed Apr. 9, 2010.

(Continued)

*Primary Examiner* — Eric Rush
(74) *Attorney, Agent, or Firm* — Oblon, Spivak, McClelland, Maier & Neustadt, L.L.P.

(57) ABSTRACT

A method of determining misalignment between a first image and a second image, the first and second images being viewable stereoscopically, the method comprising: determining a feature position within the first image and a corresponding feature position within the second image; defining, within the first image and the second image, the optical axis of the cameras capturing said respective images; and calculating the misalignment between at least one of scale, roll or vertical translation of the feature position within the first image and the corresponding feature position within the second image, the misalignment being determined in dependence upon the location of the feature position of the first image and the corresponding feature position of the second image relative to the defined optical axis of the respective images is described. A corresponding apparatus is also described.

19 Claims, 12 Drawing Sheets

FOREIGN PATENT DOCUMENTS

| | | |
|---|---|---|
| EP | 1 570 683 A1 | 9/2005 |
| EP | 1 865 728 A1 | 12/2007 |
| EP | 1 865 729 A2 | 12/2007 |
| EP | 2 106 150 A2 | 9/2009 |
| GB | 2 372 659 A | 8/2002 |
| KR | 10 2007 0061094 | 6/2007 |
| WO | WO 96/38986 A1 | 12/1996 |
| WO | WO 99/37098 A1 | 7/1999 |
| WO | WO 2004/049736 A1 | 6/2004 |

OTHER PUBLICATIONS

United Kingdom Search Report issued May 11, 2010, in United Kingdom 1003291.0, filed Feb. 26, 2010.
United Kingdom Search Report issued May 4, 2010, in United Kingdom 1003289.4, filed Feb. 26, 2010.
U.S. Appl. No. 12/947,430, filed Nov. 11, 2010, Thorpe et al.
U.S. Appl. No. 12/976,362, filed Dec. 22, 2010, Thorpe et al.
U.S. Appl. No. 13/015,251, filed Jan. 27, 2011, Thorpe et al.

* cited by examiner

METHOD AND APPARATUS FOR DETERMINING MISALIGNMENT

BACKGROUND OF THE INVENTION

1. Field of the Invention

The present invention relates to a method and apparatus for determining misalignment.

2. Description of the Prior Art

When shooting stereo video to view as a 3D image, it is common practice to shoot this footage using two cameras. In order to ensure that the footage is captured correctly, the cameras should have a similar level of zoom and minimal vertical parallax. Also, the misalignment of roll of the cameras should be minimal.

Normally, this would be corrected, where possible by a camera operator. Usually misalignment between the two cameras does not manifest itself as any one of the above errors, but is usually a combination of two or more misalignments. This makes it difficult for a camera operator to establish and correct the misalignment.

It is an aim of embodiments of the present invention to address this issue.

SUMMARY OF THE INVENTION

According to a first aspect, there is provided a method of determining misalignment between a first image and a second image, the first and second images being viewable stereoscopically, the method comprising: determining a feature position within the first image and a corresponding feature position within the second image; defining, within the first image and the second image, the optical axis of the cameras capturing said respective images; and calculating the misalignment between at least one of scale, roll or vertical translation of the feature position within the first image and the corresponding feature position within the second image, the misalignment being determined in dependence upon the location of the feature position of the first image and the corresponding feature position of the second image relative to the defined optical axis of the respective images.

This is advantageous because it allows the roll, scale and vertical misalignments to be calculated quickly and accurately allowing stereoscopic cameras to be set up quickly.

This may further comprise defining within the first image at least one further feature position, and at least one further corresponding feature position within the second image, wherein the vertical translation is calculated by: selecting two feature positions in the first image and a corresponding two feature positions within the second image; and determining the vertical translation in accordance with a given roll misalignment between the first and second images.

The feature position in the first image and the corresponding feature position in the second image may be located above the defined optical axis and the further feature position in the first image and the corresponding feature position in the second image may be located below the define optical axis.

The vertical translation may be determined using the equation $$T = \frac{(R_1 \cdot y2_l - R_2 \cdot y1_l)}{(y1_l + y2_l)}$$

where T is the value of the translation, $y1_r$ is the y co-ordinate of the feature position in the second image, $y2_1$ is the y co-ordinate of the further feature position in the first image; and $R_1 = x1_r \cdot \sin(\theta) + y1_r \cdot \cos(\theta)$ where $x1_r$ is the x co-ordinate of the corresponding feature position in the second image, $y1_r$ is the y co-ordinate of the corresponding feature position in the second image and $R_2 = x2_r \cdot \sin(-\theta) + y2_r \cdot \cos(-\theta)$ where $x2_r$ is the x co-ordinate of the corresponding further feature position in the second image and $y2_r$ is the y co-ordinate of the corresponding further feature position in the second image.

The scale may be calculated by: selecting a feature position in the first image and a corresponding feature position within the second image; and determining the scale in accordance with a given vertical translation between the first and second images.

The feature position in the first image and the corresponding feature position in the second image may be located above the defined optical axis or the feature position in the first image and the corresponding feature position in the second image is located below the defined optical axis.

The scale metric may be calculated using the equation $$S = \frac{y_l}{x_r \cdot \sin(\pm \theta) + y_r \cdot \cos(\pm \theta) \pm T}$$

where S is the scale metric, $y_1$ is the y co-ordinate of feature position in the first image, $y_r$ is the y co-ordinate of the feature position in the second image, $x_r$ is the x co-ordinate of the feature position in the second image, $\pm \theta$ is a given roll between the first and second images relative to the optical axis and $\pm T$ is a given vertical translation between the corresponding feature positions relative to the optical axis.

The method may further comprise defining within the first image at least one further feature position, and at least one further corresponding feature position within the second image, wherein the roll may be calculated by: selecting two feature positions in the first image and a corresponding two feature positions within the second image; and determining the roll in accordance with a given scale misalignment between the first and second images.

The feature position in the first image and the corresponding feature position in the second image may be located to the left of the defined optical axis and the further feature position in the first image and the corresponding feature position in the second image are located to the right of the defined optical axis.

The roll misalignment may be calculated using the equation $$\Delta \theta = \mathrm{Tan}^{-1}\left(\frac{R - L}{1 + R \cdot L}\right)$$

where $$L = \frac{(y2_l - y1_l)}{S \cdot (x2_r - x1_r)}$$

and $$R = \frac{(y2_r - y1_r)}{(x2_r - x1_r)}$$

S is the scale misalignment between the first and second images, $y2_1$ is the y co-ordinate of the further feature position in the first image, $y1_1$ is the y co-ordinate of the feature position in the first image, $y1_r$ is the y co-ordinate of the corresponding feature position in the second image, $x2_r$ is the x co-ordinate of the corresponding further feature position in the second image and $x1_r$ is the x co-ordinate of the corresponding feature position in the second image.

The feature position and the further feature position may be generated randomly.

The feature position may be a pixel position in the respective first and second image.

According to another aspect, there is provided an image processing apparatus operable to determine misalignment between a first image and a second image, the first and second images being viewable stereoscopically, the apparatus comprising: a determiner operable to determine a feature position within the first image and a corresponding feature position within the second image; a definer operable to define, within the first image and the second image, the optical axis of the cameras capturing said respective images; and a misalignment calculator operable to calculate the misalignment between at least one of scale, roll or vertical translation of the feature position within the first image and the corresponding feature position within the second image, the misalignment being determined in dependence upon the location of the feature position of the first image and the corresponding feature position of the second image relative to the defined optical axis of the respective images.

The definer may further be operable to define within the first image at least one further feature position, and at least one further corresponding feature position within the second image, wherein the vertical translation is calculated by: selecting two feature positions in the first image and a corresponding two feature positions within the second image; and determining the vertical translation in accordance with a given roll misalignment between the first and second images.

The feature position in the first image and the corresponding feature position in the second image may be located above the defined optical axis and the further feature position in the first image and the corresponding feature position in the second image may be located below the define optical axis.

The vertical translation may be determined using the equation $$T = \frac{(R_1 \cdot y2_l - R_2 \cdot y1_l)}{(y1_l + y2_l)}$$

where T is the value of the translation, $y1_r$ is the y co-ordinate of the feature position in the second image, $y2_l$ is the y co-ordinate of the further feature position in the first image; and $R_1 = x1_r \cdot \sin(\theta) + y1_r \cdot \cos(\theta)$ where $x1_r$ is the x co-ordinate of the corresponding feature position in the second image, $y1_r$ is the y co-ordinate of the corresponding feature position in the second image and $R_2 = x2_r \cdot \sin(-\theta) + y2_r \cdot \cos(-\theta)$ where $x2_r$ is the x co-ordinate of the corresponding further feature position in the second image and $y2_r$ is the y co-ordinate of the corresponding further feature position in the second image.

The scale may be calculated by: selecting a feature position in the first image and a corresponding feature position within the second image; and determining the scale in accordance with a given vertical translation between the first and second images.

The feature position in the first image and the corresponding feature position in the second image may be located above the defined optical axis or the feature position in the first image and the corresponding feature position in the second image is located below the defined optical axis.

The scale metric may be calculated using the equation $$S = \frac{y_l}{x_r \cdot \sin(\pm\theta) + y_r \cdot \cos(\pm\theta) \pm T}$$

where S is the scale metric, $y_l$ is the y co-ordinate of feature position in the first image, $y_r$ is the y co-ordinate of the feature position in the second image, $x_r$ is the x co-ordinate of the feature position in the second image, $\pm\theta$ is a given roll between the first and second images relative to the optical axis and $\pm T$ is a given vertical translation between the corresponding feature positions relative to the optical axis.

The definer may be operable to define within the first image at least one further feature position, and at least one further corresponding feature position within the second image, wherein the roll is calculated by: selecting two feature positions in the first image and a corresponding two feature positions within the second image; and determining the roll in accordance with a given scale misalignment between the first and second images.

The feature position in the first image and the corresponding feature position in the second image may be located to the left of the defined optical axis and the further feature position in the first image and the corresponding feature position in the second image are located to the right of the defined optical axis.

The roll misalignment may be calculated using the equation $$\Delta\theta = \text{Tan}^{-1}\left(\frac{R-L}{1+R\cdot L}\right)$$

where $$L = \frac{(y2_l - y1_l)}{S \cdot (x2_r - x1_r)}$$

and $$R = \frac{(y2_r - y1_r)}{(x2_r - x1_r)}$$

S is the scale misalignment between the first and second images, $y2_1$ is the y co-ordinate of the further feature position in the first image, $y1_1$ is the y co-ordinate of the feature position in the first image, $y1_r$ is the y co-ordinate of the corresponding feature position in the second image, $x2_r$ is the x co-ordinate of the corresponding further feature position in the second image and $x1_r$ is the x co-ordinate of the corresponding feature position in the second image.

The feature position and the further feature position may be generated randomly.

The feature position may be a pixel position in the respective first and second image.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF EXAMPLE EMBODIMENTS

Overall Method

In embodiments, to calculate the alignment metrics for stereo images, the following broad method is performed:
1) Key feature points in one of the two images are selected. In embodiments, the key feature points in the left image are selected.
2) The key feature points are used as the basis for a block matching process to determine the corresponding key feature points in the right hand image.
3) A series of geometric calculations is performed to yield three metrics of distortion. Specifically, a metric indicating the vertical disparity is determined, a metric indicating the scale disparity in determined and finally a metric indicating roll disparity is determined. In embodiments, the metric determined in the previous step is used in the calculation of the metric in the subsequent step. Although, this discussion indicates that the three metrics are determined in a particular order, the invention is not so limited as will be explained hereinafter. The metrics can be calculated in any order. The metrics may then be used either to adjust the physical position of the camera and/or parameters of the camera or may be used to electronically adjust the captured image to take account of the misalignment.

Figure 1:
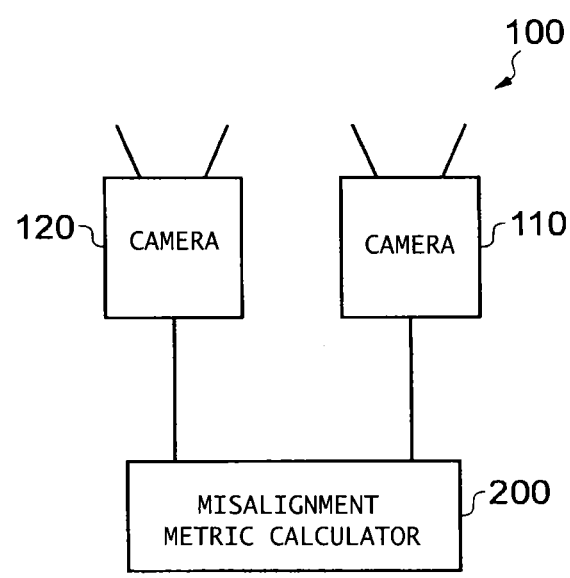
FIG. 1 shows a camera arrangement connected to a misalignment metric calculator according to an embodiment of the present invention.

FIG. 1 shows an implementation of embodiments of the present invention. Two cameras 110 and 120 are set up in a stereoscopic manner. Together, the stereoscopic cameras form a camera arrangement 100. The output from each camera is fed into a misalignment metric calculator 200 according to embodiments of the present invention. The metric calculator 200 determines the amount of misalignment between the two cameras in the arrangement 100. It should be noted here that cameras set up to capture stereoscopic images must have horizontal displacement, however, it is not essential for this algorithm for the images to have horizontal displacement. Therefore, the metric calculator 200 determines a metric indicating the vertical disparity, a metric indicating the roll disparity and a metric determining the scale disparity is produced. These metrics may be used by a camera operator to physically correct the alignment of the cameras or may be used to control a servo motor to correct the alignment. Indeed, the metrics may also be used to electronically correct the images produced by the camera arrangement 100 without any physical correction of the camera orientation.

Figure 2:
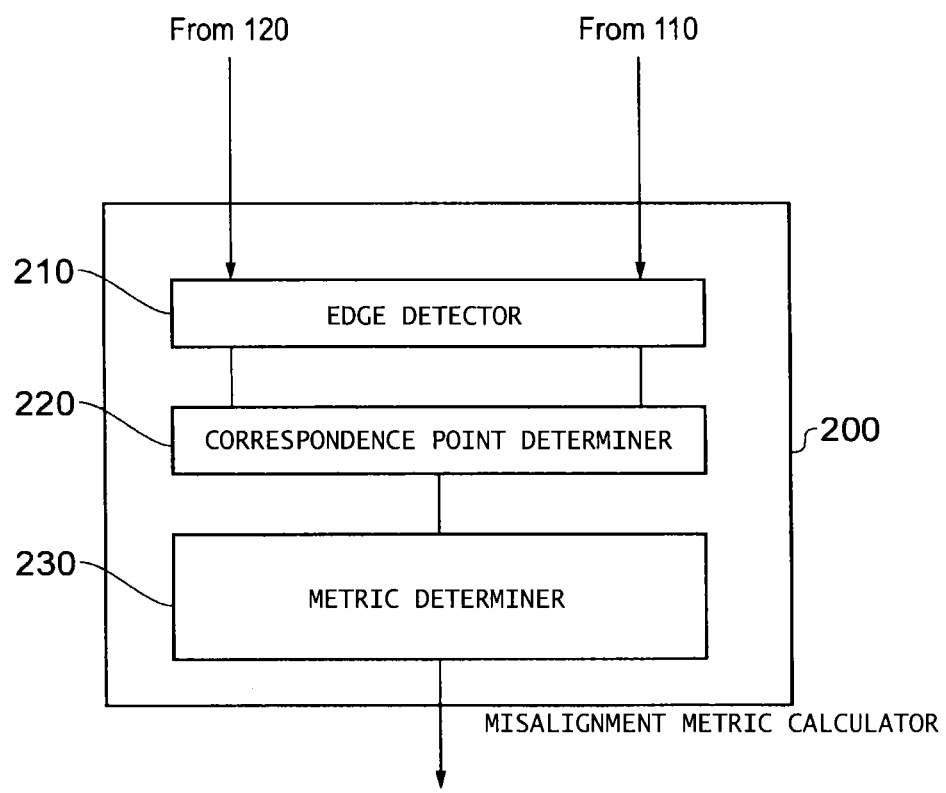
FIG. 2 shows the misalignment metric calculator of FIG. 1.

FIG. 2 shows the metric calculator 200 in more detail. The images from the two cameras are fed into an edge detector 210. The edge detector 210 is used to determine the horizontal edges in the left hand image. The detected edges are then fed to a correspondence point determiner 220 which determines points in the right hand image which correspond to points in the left hand image. In other words, the correspondence point determiner 220 determines where in the left hand image certain pixels from the right hand image are located. The metrics are calculated in the metric determiner 230 and output.

Figure 3:
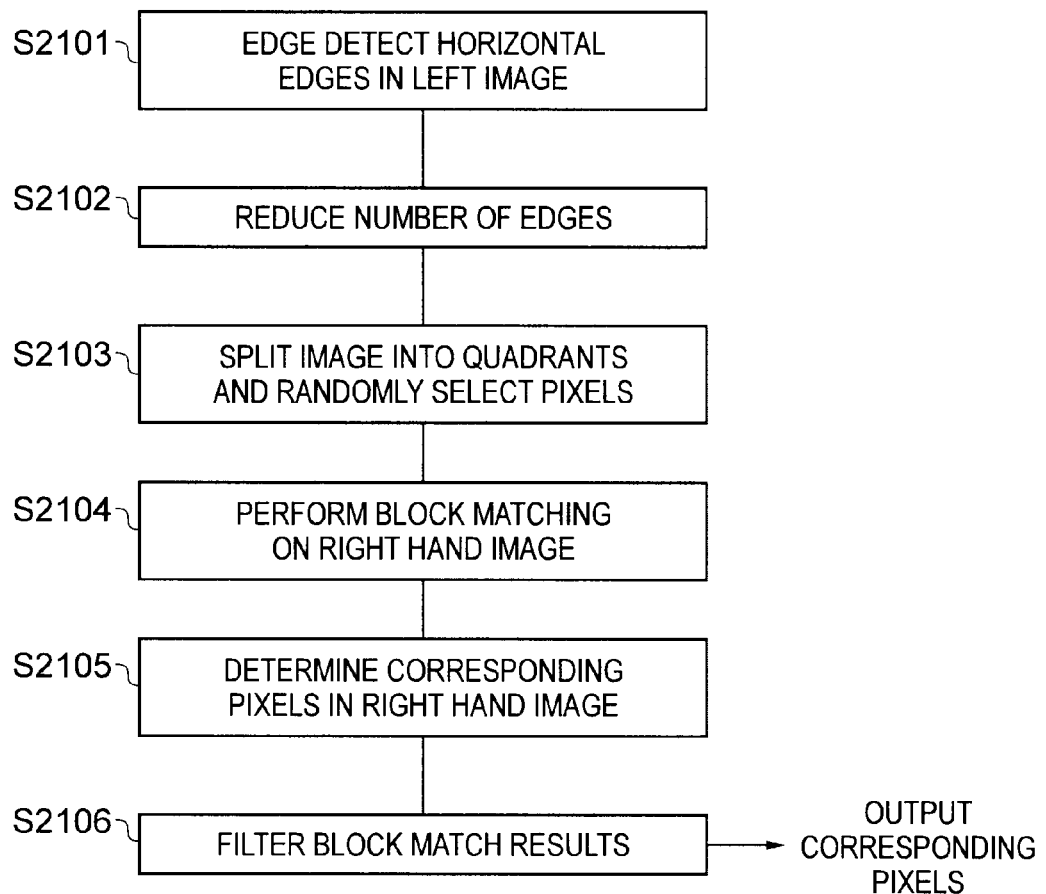
FIG. 3 shows a flow diagram explaining the process carried out by an edge detector and a correspondence point determiner in the misalignment metric calculator of FIG. 1.

FIG. 3 provides a flow diagram explaining the process carried out by the edge detector 210 and the correspondence point determiner 220. This flow diagram is narrated using the images in FIG. 4.

Figure 4:
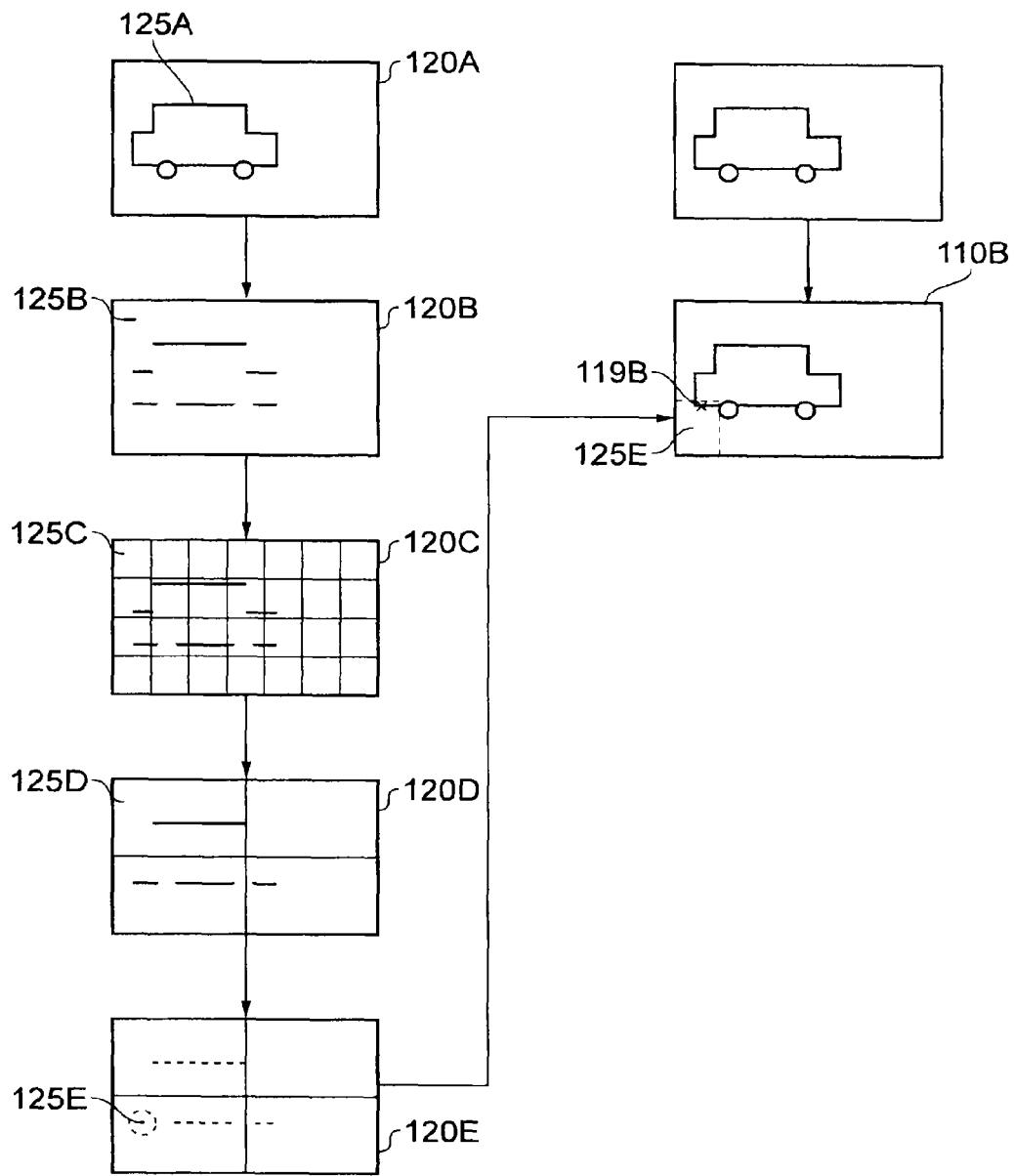
FIG. 4 shows a graphical narration of the flow diagram of FIG. 3.

In FIG. 4, the left hand image 120A (captured by the left hand camera 120) contains an image of a car 125A. In step S2101 of FIG. 3, the horizontal edges in the left hand image are detected. In embodiments, this could be achieved using an edged detect algorithm such as a Sobel edge detection algorithm for example. The reason the horizontal edges are detected is because one of the metrics to be calculated is the vertical displacement between the two images. Thus, by calculating only the horizontal edges, the number of candidate feature points is reduced without substantially impacting on the accuracy of the results.

After the Horizontal edges in the left hand image are calculated, an image similar to 120B (see FIG. 4) is produced. As can be seen from FIG. 4, an erroneous edge 125B is produced. This does not have a corresponding point in the right hand image. Accordingly, it is desirable to reduce the number of detected Horizontal edges. The reduction in the number of Horizontal edges takes place in step S2102 of FIG. 3. In order to achieve this, the edge detected image is divided into tiles (the image being represented by 120C). In embodiments, each tile is 16 pixels wide by 16 pixels high. One tile 125C is shown in FIG. 4. However, any size of tile may be selected. Similarly, any shape of tile may be selected so that the tiles are, for example, rectangular in shape. Any edges that do not transcend a tile are ignored. In other words, detected edges which are less than 16 pixels long are ignored. By performing this reduction, spurious and erroneous edges are ignored. This improves the reliability of the results as well as reduces the computational expense of the method.

After the number of detected edges is reduced, the image is divided into quadrants. The centre of the quadrant is the optical axis of the image. The reason that, in embodiments, the quadrant is centred on the optical axis is because the optical axis is linearly invariant. In other words, the optical axis is not affected by scale and roll distortion. For ease of explanation, it is assumed that the optical axis of the image is the centre of the image. However, the skilled person will understand that although this is a very valid assumption, this is not always the case. This is shown in 120D in FIG. 4, where one quadrant 125D is highlighted.

After the image has been divided into quadrants, a sample number of edge pixels are selected from each quadrant (step S2103). In embodiments, 20 pixels are selected from each quadrant although the invention is not so limited and any number of pixels may be selected. This selection may be based on a balance between accuracy and speed of computation as would be appreciated. Further, in embodiments, the pixels are selected randomly, although the invention is not so limited.

A typical image where a selected number of pixels have been selected is shown at 120E in FIG. 4. One such pixel position is highlighted at 125E. It should be noted that a pixel position is defined as a suitable feature point, but the invention is not so limited. Other feature points such as sub-pixel position may also be determined as would be appreciated. As any one of a number of sub-pixels can exist at a "normal" pixel position, the value of the sub-pixel may be selected randomly or by some other method. Further, a user could be informed of the different possible sub-pixel values at the "normal" pixel position.

The method so far has identified feature positions in the left hand image. These feature positions are pixel positions in the left hand image. It is now necessary to determine where corresponding pixels positions in the right hand image exist.

In order to do, a search is carried out at each defined pixel position in the right hand image. In other words, as the position of a number of pixel positions are defined in the left hand image, a search needs to be carried out around the same pixel position in the right hand image to determine where a corresponding pixel is positioned. This is achieved using a block matching technique.

In step S2104 a conventional block matching technique is carried out at each pixel position in the right hand image to determine the corresponding pixel position. An illustration of this is shown in FIG. 4 at 110B. As is seen in image 110B, the pixel position 119B derived from the left hand image forms the centre of a search area in the right hand image 110B. The size of the search area must accommodate misalignments due to errors as well as the deliberate Horizontal displacement required to achieve stereoscopic viewing. So, for a typical high definition image, in embodiments the search area is 250 pixels wide by 100 pixels wide. However, the invention is not so limited and other size and shape search areas may be used.

The result of the block matching technique is a map of probabilities which provide the probability of each pixel position in the search area corresponding to the pixel position 125E defined in the left hand image. The pixel position in the right hand image having the highest probability is selected as being the pixel position in the right hand image corresponding to the pixel position in the left hand image 125E. As is seen in FIG. 4, the pixel position in the right hand image is defined as pixel position 119B. This is repeated for all the pixel positions defined in the left hand image as noted in step S2105.

In order to ensure that the number of erroneous results is reduced, the results from step S2105 are filtered. As a first filter, as a definite corresponding pixel position in the right hand image should have a probability of 1, all results below a certain threshold of, for example, 0.98 (or 98% certainty) are ignored. This reduces the number of erroneous results. As this is an example threshold, other suitable thresholds are envisaged and the invention is not so limited.

Further, as the pixel positions in the left hand image are edge pixel positions, the corresponding points in the right hand image should also be edge pixel positions. Therefore, the right hand image is also subjected to an edge detect algorithm such as Sobel edge detection algorithm to detect the horizontal edges. If the corresponding pixel position in the right hand image is located on one of these horizontal edges, then there is an increased probability that the pixel position in the right hand image does correspond to the pixel position determined in the left hand image. It should be noted that either or both of these techniques can be used to reduce the likelihood of erroneous results. Indeed, a combination of both techniques may also be used.

Referring to FIG. 2, the output from the correspondence point determiner 220 is a list of pixel positions in the left hand image and a list of corresponding points in the right hand image. These are fed into the metric calculator 230. Although the foregoing has been explained, a conventional technique for determining positions in one image and corresponding points in a second image may equally be used. However, it should be noted here that the aforementioned method is quicker and less computationally expensive than more conventional techniques such as Scale-Invariant Feature Transform (SIFT).

Calculation of Metrics

Figure 5:
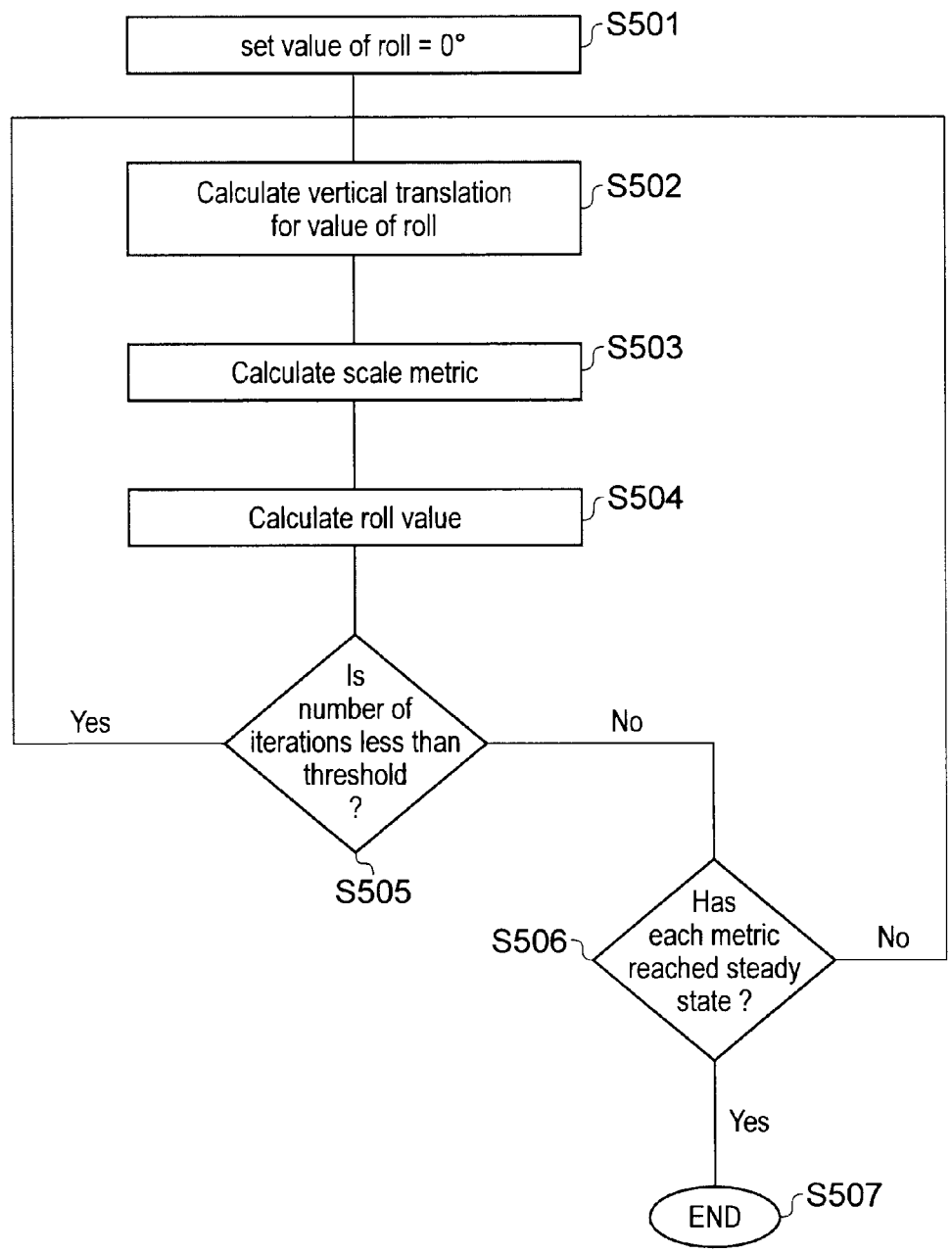
FIG. 5 shows a flow diagram explaining the calculation of the misalignment metrics.

FIG. 5 shows a flow diagram explaining the calculation of the metrics after the corresponding points have been determined. As will be noted from the structure of the algorithm, the values of the metrics are calculated iteratively. During each iteration of the algorithm, the values of the metrics begin to converge to a steady value. It should be noted here that the algorithm is run in real-time. This means that for one frame of video, the algorithm may not reach the required steady state. If this is the case, then the algorithm is run over a number of different frames. This is because the misalignment is unlikely to change over a small number of frames required until a steady state is reached. It should be noted that if the metric algorithm is required to be run for another frame of video, the correspondence algorithm described in FIG. 3 will need to be run for the new frame of video. Whereas, if the steady state is reached during one frame of video, the correspondence algorithm of FIG. 3 needs to be run only once.

After the steady state is reached, the algorithm may be run periodically, for example once every 10 seconds or after a predetermined number of frames, to ensure that the cameras have not become misaligned. Alternatively, the algorithm may be run after the focal length of the cameras has changed or in response to any other action.

In step S501, before a first iteration of the calculation of the metrics, the roll metric is set to be 0°. This value of the roll metric will be updated during the first iteration of the metric calculation algorithm. The reason that the roll metric is set to 0° in preference to any other assumed value of a metric is because the roll metric will be close to zero. This is because during the initial set-up by the camera operator, the roll difference is likely to be small due to the effect of mismatch in the roll on the image. Therefore, by making the initial assumption that the roll metric is 0°, the accuracy of the other metrics initially will be high and so the overall algorithm will approach a suitable level of accuracy more quickly.

In step S502, the vertical translation metric will be calculated using the value of roll. This will be explained later with reference to FIG. 6.

In step S503, the scale metric will be calculated using the calculated value of the vertical translation metric. This will be explained later with reference to FIG. 8.

In step S504, the roll metric will be calculated using the calculated value of the scale metric. This will be explained later with reference to FIG. 9.

As the metrics are calculated on an iterative basis, in step S505, the number of iterations of the metric calculation for one frame of video is determined. If the number of iterations is below a threshold value (for example 5), the algorithm is run again using the values calculated in the previous iteration as an initial value.

If the number of iterations is above a threshold, the algorithm is checked to confirm whether a steady state has been reached (step S506). This may be determined if the values of the metrics between iterations does not change by a threshold value such as 0.05%. If the metrics are a steady state, the metric values are output and the algorithm waits until it is required again, for example if the camera settings change as noted above and ends at step S507.

Calculation of Vertical Translation Metric (Step S502 of FIG. 5)

Figure 6:
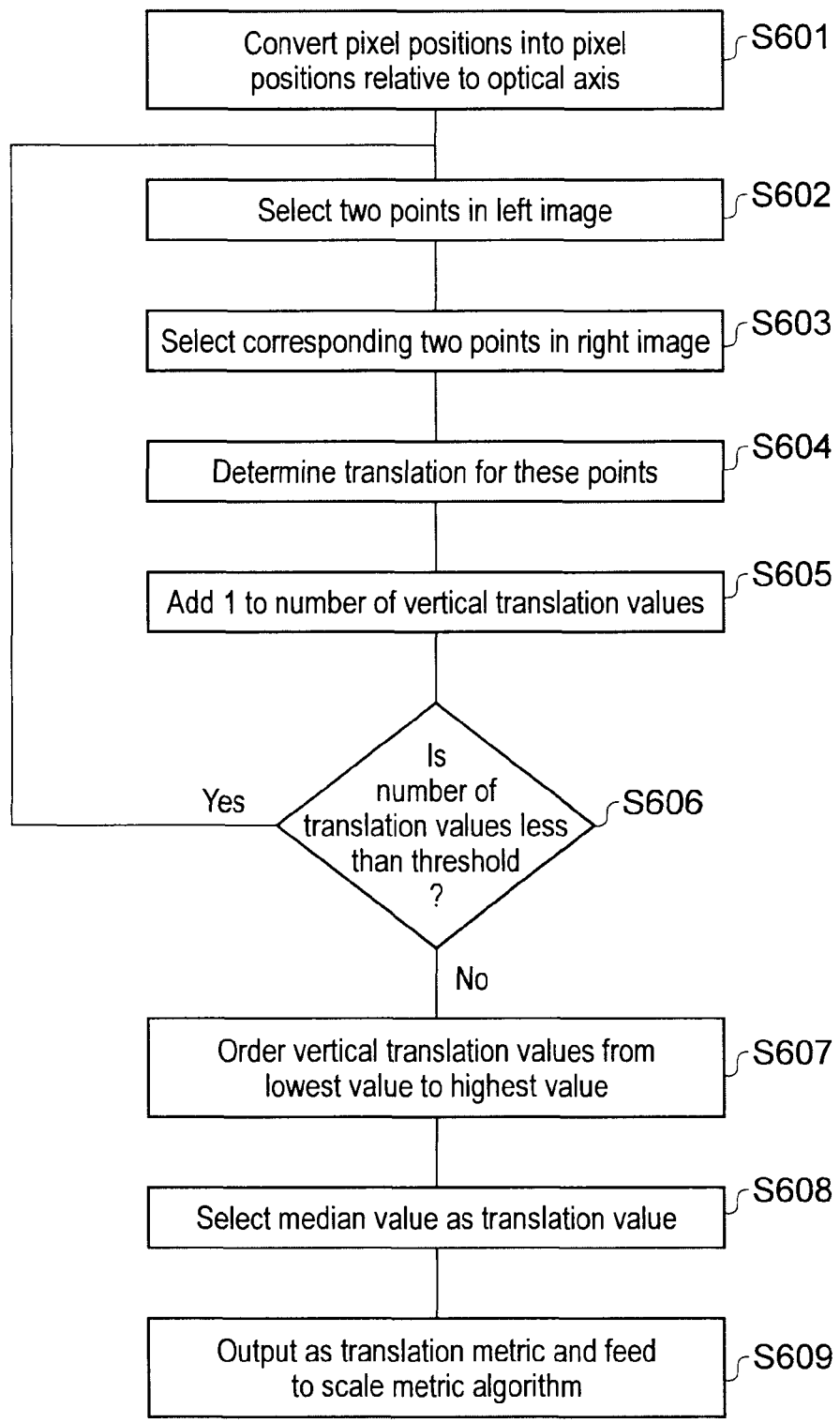
FIG. 6 shows a flow diagram explaining the principle for determining the vertical translation metric.

FIG. 6 shows a flow diagram explaining the principle for determining the vertical translation metric.

Figure 7:
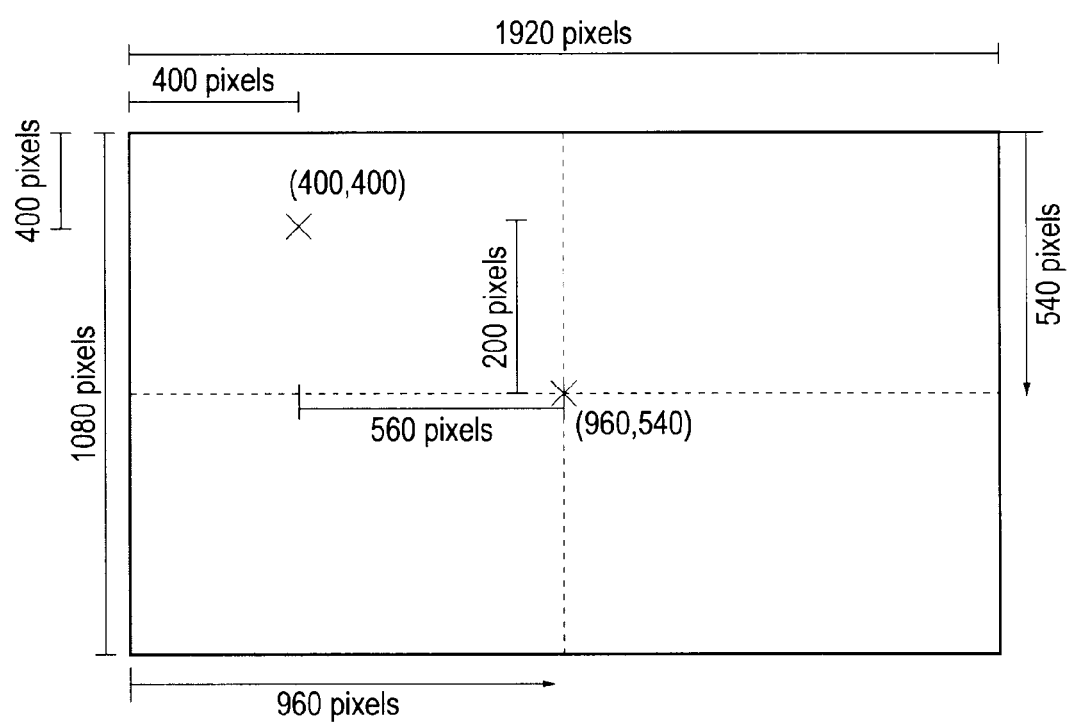
FIG. 7 shows a method for converting the pixel positions into pixel positions relative to the optical axis.

As the optical axis is scale invariant, it is advantageous to calculate the vertical translation value relative to the optical axis of the image captured by the camera. In order to do this, the pixel positions determined by the correspondence determiner 220 need to be converted to pixel positions relative to the optical axis (step S601). FIG. 7 shows a method for converting the pixel positions into pixel positions relative to the optical axis. In a conventional pixel labelling scheme, for a high definition image, the top left pixel position is defined as (0,0) and the bottom right pixel position is (1920, 1080). Therefore, in such a conventional system, the centre of the image (which is assumed to be the optical axis position as noted above) has a pixel position of (960,540). (see previous note) However, in embodiments of the invention, the centre of the image has a pixel position of (0,0). In order to convert the conventional pixel position of (400,400) to be relative to the optical axis, the distance between the pixel position and the centre of the image needs to be determined. From FIG. 7, it is apparent that conventional pixel position (400,400) is 560 pixels to the left of the optical axis and 140 pixels above the optical axis. Therefore, conventional pixel position (400,400) is pixel position (−560, 140) relative to the optical axis.

In order to determine the metric indicating the vertical translation metric, two feature positions from the left image are selected. Specifically, one feature position located below the optical axis and one feature position above the optical axis in the left hand image is selected (S602). In embodiments, these feature points are selected randomly, although the invention is not so limited. Also selected are the corresponding feature positions from the right hand image (S603).

After the points are selected, they are placed into Equation 1 below to determine the value of translation (S604).

$$T = \frac{y2_l \cdot R_1 - y1_l \cdot R_2}{y1_l + y2_l} \quad \text{Equation 1}$$

Where $R_1 = x1_r \cdot \sin(\pm\theta) + y1_r \cdot \cos(\pm\theta)$ and
$R_2 = x2_r \cdot \sin(\pm\theta) + y2_r \cdot \cos(\pm\theta)$ where T is the value of the translation, $y1_r$ is the y co-ordinate of the feature position in the second image, $y2_l$ is the y co-ordinate of a further feature position in the first image; $x1_r$ is the x co-ordinate of a feature position in the second image that corresponds to the feature position in the first image, $y1_r$ is the y co-ordinate of the corresponding feature position in the second image, $x2_r$ is the x co-ordinate of the corresponding further feature position in the second image and $y2_r$ is the y co-ordinate of the corresponding further feature position in the second image.

A derivation of this formula is provided at the end of the description.

It should be noted here that the sign of the value of θ in the values of $R_1$ and $R_2$ is dependent upon the quadrant in which the feature point p1 and p2 lie. Specifically, if the feature point (or position) lies in the bottom right or top left quadrants, then the roll value is −θ. Alternatively, if the feature point lies in the bottom left or top right quadrants, the roll value is +θ. This is because the roll is measured relative to the optical axis.

After the translation for these points is determined, the number of calculated vertical translation metrics is incremented by 1 (step S605). This number is compared with a threshold value (step S606). If the number of calculated metric values is less than the threshold, then another two points are selected and the vertical translation metric algorithm is run again. In embodiments, the threshold value is 20, although any other value is anticipated.

If the number of calculated metric values is above the threshold then the calculated values are ordered from lowest to highest (step S607). The median value of the ordered list is then selected (step S608) and this is deemed to be the calculated metric value for step S502 of FIG. 5. This median metric value is output as the vertical translation metric (step S609) and is fed to the scale metric algorithm (step S503 of FIG. 5). It should be noted that the median value may be selected directly from the derived values. In other words, there may be no need to order the metric values before selecting a median value. This applies to the calculation of the other metrics.

Calculation of Scale Metric (Step S503 of FIG. 5)

Figure 8:
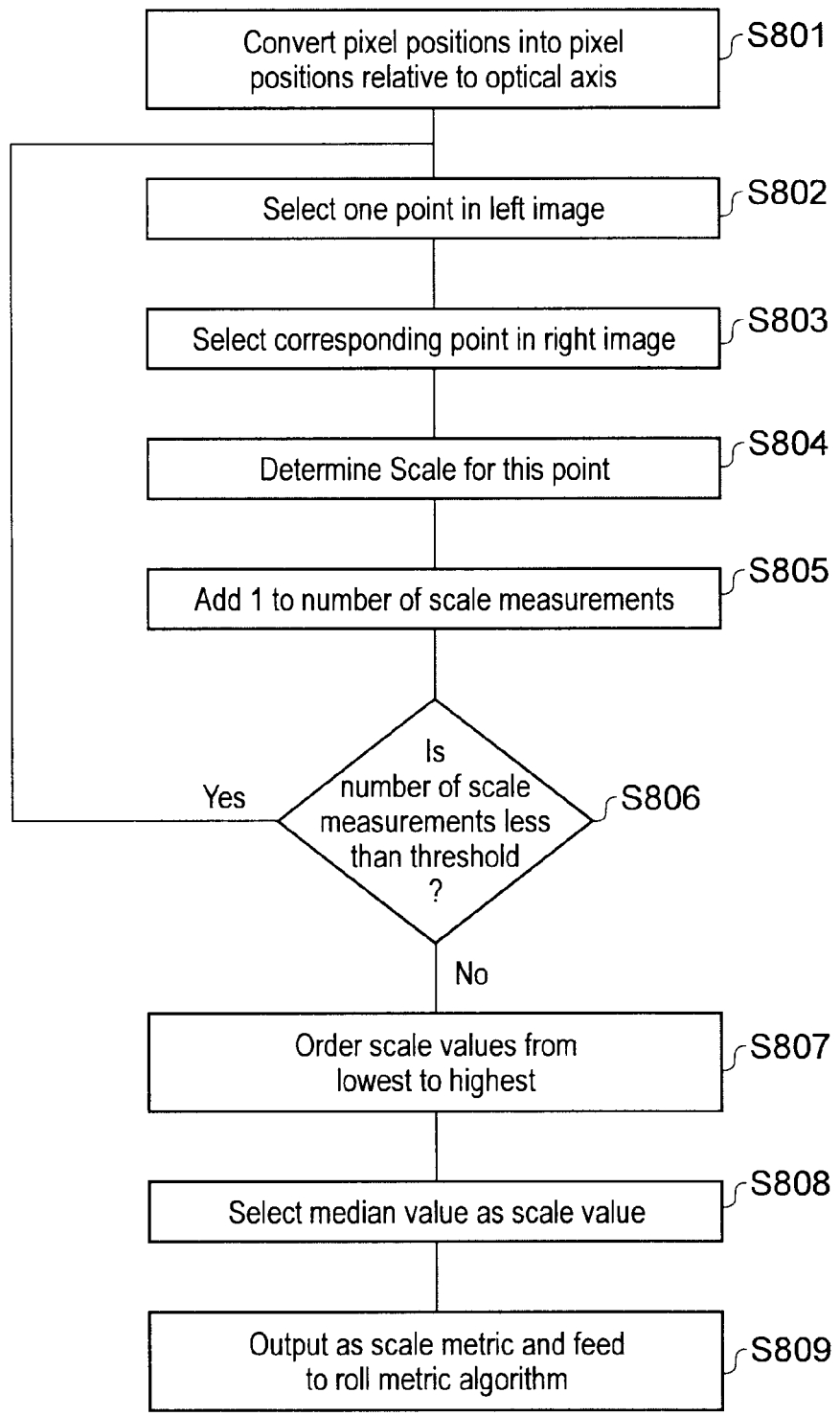
FIG. 8 shows a flow diagram explaining the principle for determining the Scale metric.

FIG. 8 shows a flow diagram explaining the principle for determining the Scale metric.

In step S801, the pixel positions determined in the correspondence determiner 220 are converted into pixel positions relative to the optical axis as explained with reference to FIG. 7.

In order to determine the scale metric, a feature position from the left image is selected (S802). In embodiments, the feature point is selected randomly, although the invention is not so limited. Also selected is the corresponding feature position from the right hand image (S803).

After the point is selected, it is placed into Equation 2 below to determine the value of scale (S804).

$$S = \frac{y_l}{x_r \cdot \sin(\pm\theta) + y_r \cdot \cos(\pm\theta) \pm T} \quad \text{Equation 2}$$

Where the sign of T, the translation metric, is dependent upon where the point is located; $y_l$ is the y co-ordinate of feature position in the first image, $y_r$ is the y co-ordinate of the feature position in the second image, $x_r$ is the x co-ordinate of the feature position in the second image. If p is located above the optical axis, the value is +T, and where the point is located below the optical axis, the value is −T. Also, the sign of θ is dependent upon which quadrant point p is located in as noted later.

A derivation of this formula is also provided at the end of the description.

After the scale is determined, the number of calculated scale metrics is incremented by 1 (step S805). This number is compared with a threshold value (step S806). If the number of calculated metric values is less than the threshold, then another point is selected and the scale metric algorithm is rim again. In embodiments, the threshold value is 20, although any other value is anticipated.

If the number of calculated metric values is above the threshold then the calculated values are ordered from lowest to highest (step S807). The median value of the ordered list is then selected (step S808) and this is deemed to be the calculated metric value for step S503 of FIG. 5. This median metric value is output (step S809) as the scale metric and is fed to the roll metric algorithm (step S504 of FIG. 5).

Calculation of Roll Metric

Figure 9:
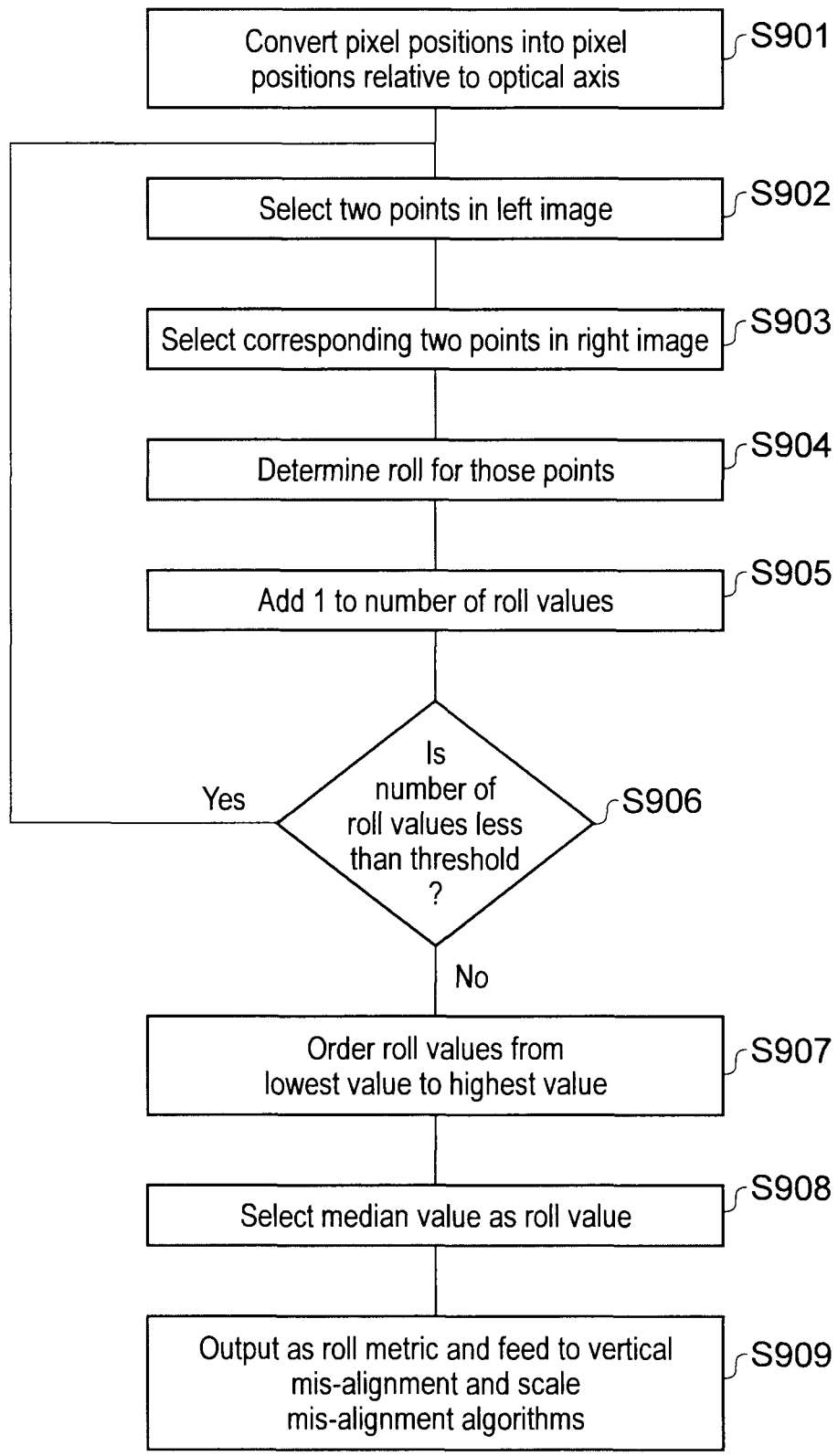
FIG. 9 shows a flow diagram explaining the principle for determining the roll metric.

FIG. 9 shows a diagram explaining the principle for determining the roll calculation.

In step S901, the pixel positions determined in the correspondence determiner 220 are converted into pixel positions relative to the optical axis as explained with reference to FIG. 7.

In order to determine the roll metric, two feature positions from the left image are selected. Specifically, one feature position located to the left of the optical axis and one feature position to the right of the optical axis in the left hand image is selected (S902). In embodiments, these feature points are selected randomly, although the invention is not so limited. Also selected are the corresponding feature positions from the right hand image (S903).

After the points are selected, they are placed into Equation 3 below to determine the value of translation (S904).

$$\Delta\theta = \text{Tan}^{-1}\left(\frac{R-L}{1+R \cdot L}\right) \qquad \text{Equation 3}$$

Where $$R = \frac{(y2_r - y1_r)}{(x2_r - x1_r)} \text{ and } L = \frac{(y2_l - y1_l)}{S \cdot (x2_r - x1_r)}$$

and S is the scale metric

S is the scale misalignment between the first and second images, $y2_l$ is the y co-ordinate of the further feature position in the first image, $y1_l$ is the y co-ordinate of the feature position in the first image, $y1_r$ is the y co-ordinate of the corresponding feature position in the second image, $x2_r$ is the x co-ordinate of the corresponding further feature position in the second image and $x1_r$ is the x co-ordinate of the corresponding feature position in the second image.

A derivation of this formula is provided at the end of the description.

After the roll for these points is determined, the number of calculated roll metrics is incremented by 1 (step S905). This number is compared with a threshold value (step S906). If the number of calculated metric values is less than the threshold, then another two points are selected and the roll metric algorithm is run again. In embodiments, the threshold value is 20, although any other value is anticipated.

If the number of calculated metric values is above the threshold then the calculated values are ordered from lowest to highest (step S907). The median value of the ordered list is then selected (step S908) and this is deemed to be the calculated metric value for step S504 of FIG. 5. This median metric value is output as the roll metric.

If, in step S505 or S506, the metric calculation algorithm is run again, the value of roll calculated in step S908 is used in the next iteration. However, if the metric calculation algorithm is not run again, the roll metric calculated in step S908, as well as the vertical translation metric from step S608 and the scale metric from step S808 are output as the results of the metric calculation algorithm in step S909.

Other Embodiments

In the above a steady state is noted. It should be noted that this is not essential to the invention. A single iteration of the algorithm will indicate a level of mismatch allowing for correction to take place. Indeed, any number of iterations will identify an amount of mismatch.

Embodiments of the present invention may be provided as computer readable instructions which when loaded onto a computer, configure the computer to perform the embodied method. The computer readable instructions may be written in any computer readable language or indeed any language that can be understood by an appropriate microprocessor. The computer program may be stored on a recording medium such as a magnet disc, or optical disc or any solid-state memory. Further the computer program may exist as a carrier on a network, such as the Internet.

Although the above notes the conversion of the pixels to be relative to the optical axis of the image in each individual algorithm, the invention is not so limited. Indeed, the conversion may take place after the correspondence points are calculated and before the feature points are passed to the metric calculator 230. This would reduce the computational burden in the metric calculator 230. Moreover, in the same and other embodiments, only the selected pixel positions used in each algorithm will be converted to be relative to the optical axis. In other words, only after the points are selected to calculate a metric are they converted.

Although the foregoing has been described with the different metrics being calculated in a particular order, the invention is not so limited. The metrics may be calculated in any order.

Although the foregoing has been described with the metrics being obtained from a high definition image, the invention is not so limited. For example, the metrics could be obtained from a standard definition image, or from a reduced scale version of the high definition image. For example, the metrics could be obtained from a 4:1 reduction in scale.

In this case, one pixel in the reduced image is formed of four pixels in the high definition image. In this situation, the actual pixel value for the reduced image could be selected from the four possible pixel values in the high definition image. Such selection may be made randomly.

Further, in the case that the misalignment metric value or values indicate that the error is not an integer pixel value, then the nearest integer pixel value above and below the misalignment value may be displayed to the user so that they can select which pixel they wish to use, or may even select the nearest pixel value rounded to the nearest integer.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

Derivation of Translation Metric

Figure 10:
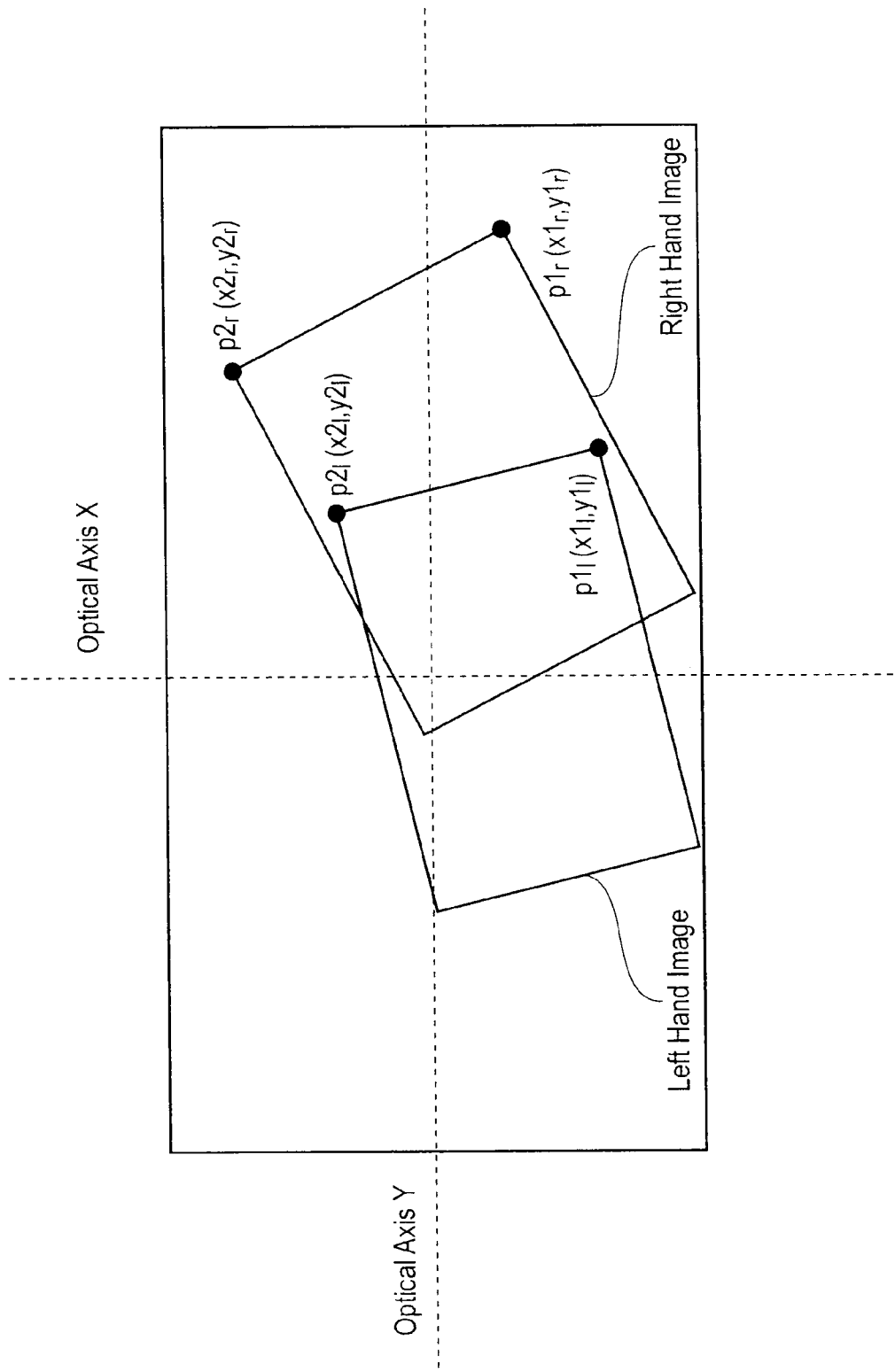
FIG. 10 shows a diagram explaining the determination of the vertical translation metric algorithm.

Referring to FIG. 10, given two points p1, described by the coordinate pair (x1, y1) and p2, described by the coordinate pair (x2, y2) we can express the position of $y1_l$ and $y2_l$ in terms of rotation, translation and scaling of the points $y1_r$ and $y2_r$.

Given that $y1_l$ lies above the optical axis, it can be described as:

$$y1_l = S(x1_r \cdot \sin(\theta) + y1_r \cdot \cos(\theta) - T) \qquad [4]$$

Given that $y2_l$ lies below the optical axis, it can be described as:

$$y2_l = S(x2_r \cdot \sin(-\theta) + y2_r \cdot \cos(-\theta) + T) \qquad [5]$$

where S is the constant describing scale and T the constant describing vertical translation.

From [4], for the point p1 above the optical axis:

$$S = \frac{y1_l}{(R_1 - T)} \qquad [6]$$

where $$R_1 = x1_r \cdot \sin(\theta) + y1_r \cdot \cos(\theta)$$

And from [5], for the point p2 below the optical axis:

$$S = \frac{y2_l}{(R_2 + T)} \quad [7]$$

where $$R_2 = x2_r \cdot \sin(-\theta) + y2_r \cdot \cos(-\theta)$$

Because S is equivalent in [6] and [7] it follows that:

$$\frac{y1_r}{(R_1 - T)} = \frac{y2_l}{(R_2 + T)}$$

$$y1_r(R_2 + T) = y2_l(R_1 - T)$$

$$R_2 \cdot y1_l + T \cdot y1_r = R_1 \cdot y2_l - T \cdot y2_l$$

$$T(y1_l + y2_l) = R_1 y2_l - R_2 y1_l$$

$$T = \frac{(R_1 \cdot y2_l - R_2 \cdot y1_l)}{(y1_l + y2_l)}$$

Derivation of Scale Metric

From equations [6] and [7] above, it can be seen that the scale, S can be calculated as follows.

$$S = \frac{y1_l}{(R_1 - T)}$$

where $R_1 = x1_r \cdot \sin(\theta) + y1_r \cdot \cos(\theta)$ for a point located above the optical axis and $$S = \frac{y2_l}{(R_2 + T)}$$

where $R_2 = x2_r \cdot \sin(-\theta) + y2_r \cdot \cos(-\theta)$ for a point located below the optical axis.

This can be generalised as $$S = \frac{y_l}{x_r \cdot \sin(\pm\theta) + y_r \cdot \cos(\pm\theta) \pm T}$$

Where the sign of T, the translation metric, is dependent upon where the point is located; if p is located above the optical axis, the value is +T, and where the point is located below the optical axis, the value is −T. Also, the sign of θ is dependent upon which quadrant point p is located.

Derivation of Roll Metric

Figure 11:
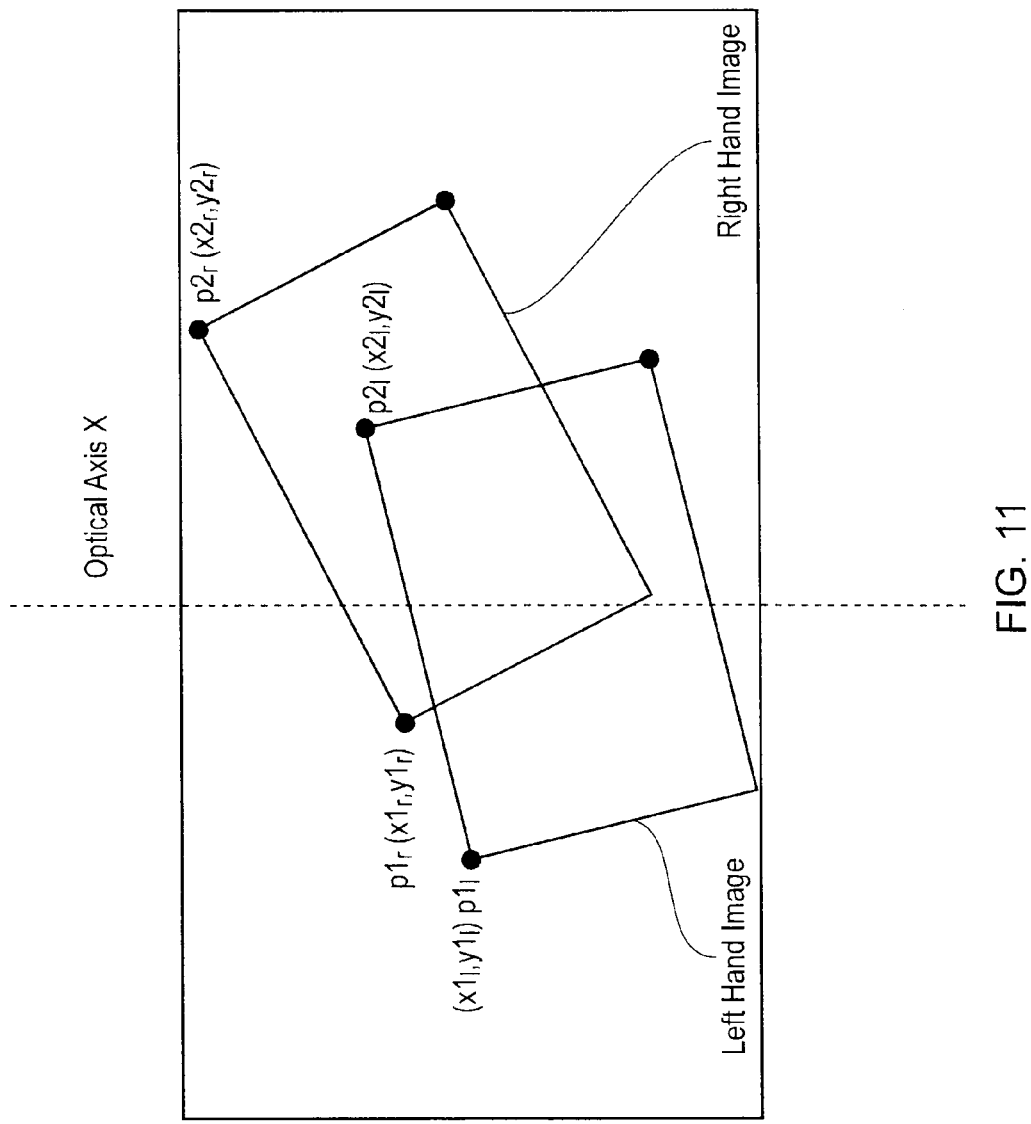
FIGS. 11 and 12 show diagrams explaining the determination of the roll metric algorithm.
Figure 12:
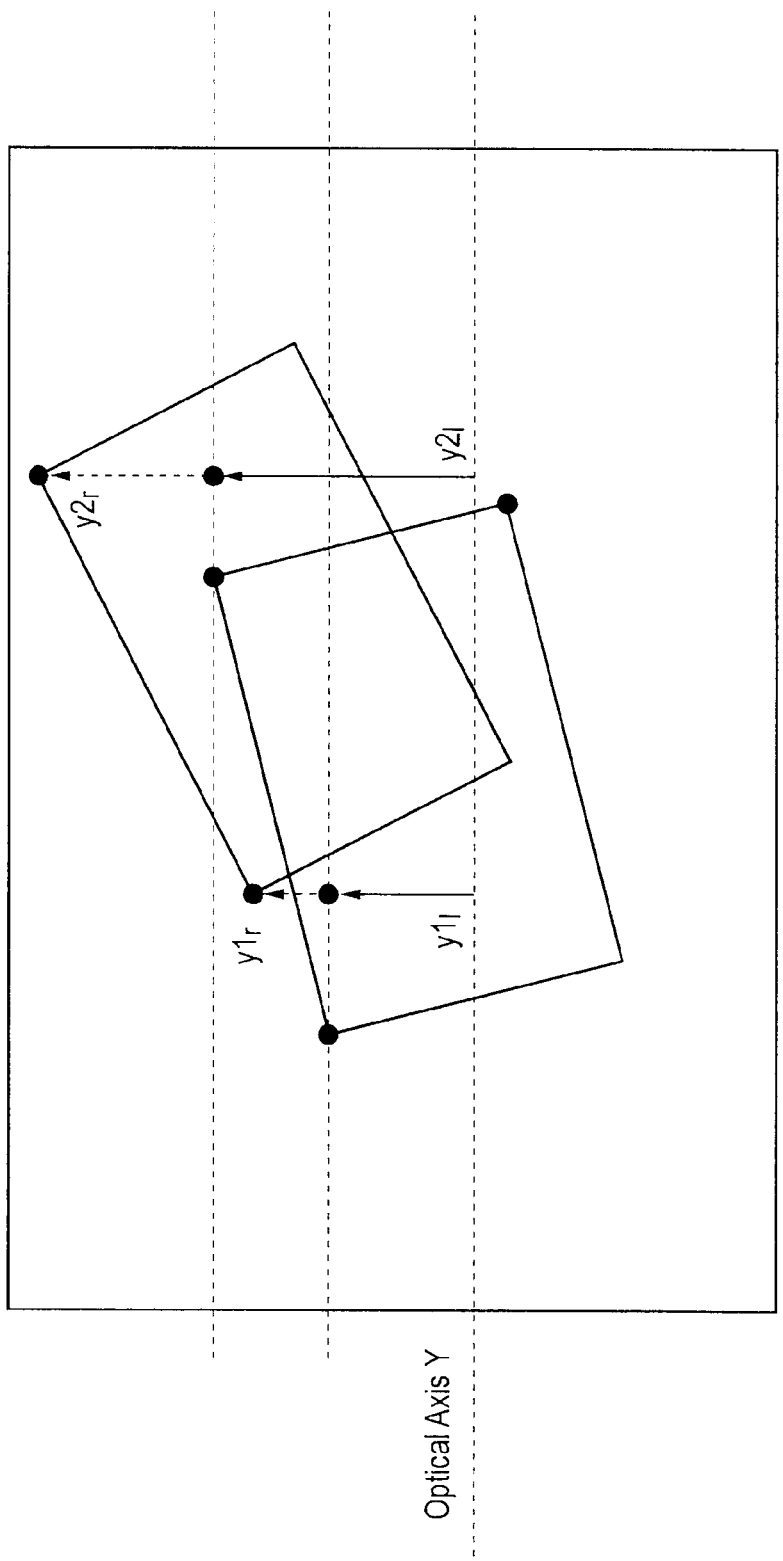

Referring to FIG. 11 which shows the selection of points used for rotation calculation and FIG. 12 that shows the measuring of angles based on the vertical position, random key feature positions are selected, one selected from the left hand side of the optical axis (p1), and one selected from right hand side of the optical axis (p2).

To measure the relative rotation of the points p1 and p2 it is necessary to determine the gradient between $p1_l$ and $p2_l$, and compare it to the gradient between $p1_r$ and $p2_r$. In other words, compare the gradient between the two points in the left hand image, and the gradient between the corresponding points in the right hand image. It should be noted that the rotation calculation is invariant to Translation, but not to Scale. Therefore Scale (S) is accounted for within the calculation.

The gradient between $p1_r$ and $p2_r$ is calculated as:

$$\operatorname{Tan}(\theta_r) = \frac{(y2_r - y1_r)}{(x2_r - x1_r)} \quad [8]$$

If we assumed no vertical parallax, and only effects due to scale (S) i.e.

$$y1_r = \frac{y1_l}{S}$$

and $$y2_r = \frac{y2_l}{S}$$

then the gradient without parallax would be $$\operatorname{Tan}(\theta_l) = \frac{(y2_l - y1_l)}{S \cdot (x2_r - x1_r)} \quad [9]$$

If we express [8] as:

$$\operatorname{Tan}(\theta_r) = R$$

where $$R = \frac{(y2_r - y1_r)}{(x2_r - x1_r)}$$

And [9] as:

$$\operatorname{Tan}(\theta_l) = L$$

where $$L = \frac{(y2_l - y1_l)}{S \cdot (x2_r - x1_r)}$$

Then the actual angle of the roll metric can be calculated as:

$$\Delta\theta = \operatorname{Tan}^{-1}(R) - \operatorname{Tan}^{-1}(L)$$

Given the trigonometric identity:

$$\operatorname{Tan}^{-1}(\alpha) - \operatorname{Tan}^{-1}(\beta) = \operatorname{Tan}^{-1}\left(\frac{\alpha - \beta}{1 + \alpha \cdot \beta}\right)$$

We can express the roll metric as:

$$\Delta\theta = \operatorname{Tan}^{-1}\left(\frac{R - L}{1 + R \cdot L}\right)$$

Alternative Embodiment

Although the foregoing has been explained with reference to calculating the roll, scale and vertical translation metric using the foregoing method, the invention is not so limited.

After the correspondence feature points have been derived and converted into positions relative to the optical axis of the images, an alternative method of deriving the metrics as below may be used.

Referring back to FIG. 10, if we make the assumption that the vertical offset is fixed, so that the vertical offset is invariant to scale and roll rotation, it can be seen that $$y2_r = S \cdot (x2_l \cdot \sin\theta + y2_l \cdot \cos\theta) + T \qquad [10]$$

where $y2_r$ is the vertical position of point $p2_r$ (relative to the optical axis); $x2_l$ and $y2_l$ are the respective horizontal and vertical positions of point $p2_l$; $\theta$ is the roll angle; S is the scale metric and T is the vertical mismatch metric between the two images.

Additionally, it is possible to measure the difference in vertical position between points $p2_l$ and $p2_r$, d, by using block matching.

In other words, $d = y2_r - y2_l$ [11]

Accordingly, using [10] and [11], it is apparent that $$T = y2_l(1 - S \cdot \cos(\theta)) - x2_l \cdot S \cdot \sin(\theta) + d$$

$$T = a \cdot y2_l - b \cdot x2_l + d \qquad [12]$$

where $a = 1 - S \cdot \cos(\theta)$ [13]

and $b = S \cdot \sin(\theta)$ [14]

As there are three unknown parameters, T, scale and $\theta$ (or T, a and b), it is possible to find these values using 3 points, having co-ordinates (x,y) described relative to the optical axis, in the left image, $p1_l$, $p2_l$ and $p3_l$ and corresponding points in the right image, it is possible to show that $$b = \frac{(y_{l1} - y_{l3})(d_2 - d_1) - (y_{l1} - y_{l2})(d_3 - d_1)}{(y_{l1} - y_{l3})(x_{l1} - x_{l2}) - (y_{l1} - y_{l2})(x_{l1} - x_{l3})}$$

and $$a = \frac{(d_3 - d_1) - b(x_{l1} - x_{l3})}{(y_{l1} - y_{l3})}$$

From [12], [13] and [14], it is apparent that T, $\theta$ and S can be established If more than 3 feature points are measured, in embodiments it is possible to list the points in order descending the image (i.e. from top to bottom of the image). Three of these correspondences are selected. The three points to be selected are the ith, ith+n/3 and ith+2n/3 feature points, where i is the iteration of the feature point selection (between 0 and n/3−1) and n is the number of feature points measured. The values of a, b and T are calculated for each iteration and after all the iterations have taken place, the values are ordered. The median value of a, b and T is selected as the best estimate and these values are used to calculate T, scale and $\theta$.

We claim:

1. A method of determining misalignment between a first image and a second image, the first and second images being viewable stereoscopically, the method comprising:
   determining a feature position within the first image and a corresponding feature position within the second image;
   defining, within the first image and the second image, an optical axis of cameras capturing said respective images;
   calculating the misalignment between at least one of scale, roll or vertical translation of the feature position within the first image and the corresponding feature position within the second image, the misalignment being determined in dependence upon the location of the feature position of the first image and the corresponding feature position of the second image relative to the defined optical axis of the respective images; and
   defining within the first image at least one further feature position, and at least one further corresponding feature position within the second image, wherein the vertical translation is calculated by: selecting two feature positions in the first image and a corresponding two feature positions within the second image; and determining the vertical translation in accordance with a given roll misalignment between the first and second images,
   wherein the feature position in the first image and the corresponding feature position in the second image are located above the defined optical axis and the at least one further feature position in the first image and the at least one further corresponding feature position in the second image are located below the defined optical axis, and
   wherein the vertical translation is determined using the equation $$T = \frac{(R_1 \cdot y2_l - R_2 \cdot y1_l)}{(y1_l + y2_l)}$$

where T is the value of the translation, $y1_l$ is the y co-ordinate of the feature position in the first image, $y2_l$ is the y co-ordinate of the at least one further feature position in the first image; and $R_1 = x1_r \cdot \sin(\theta) + y1_r \cdot \cos(\theta)$ where $x1_r$ is the x co-ordinate of the corresponding feature position in the second image, $y1_r$ is the y co-ordinate of the corresponding feature position in the second image and $R_2 = x2_r \cdot \sin(-\theta) + y2_r \cdot \cos(-\theta)$ where $x2_r$ is the x co-ordinate of the at least one further corresponding feature position in the second image, $y2_r$ is the y co-ordinate of the at least one further corresponding feature position in the second image and $\theta$ is the given roll misalignment.

2. A method according to claim 1 wherein the scale is calculated by: selecting the feature position in the first image and the corresponding feature position within the second image; and determining the scale in accordance with a given vertical translation between the first and second images.

3. A method according to claim 2, wherein the feature position in the first image and the corresponding feature position in the second image is located above the defined optical axis or the feature position in the first image and the corresponding feature position in the second image is located below the defined optical axis.

4. A method according to claim 3, wherein a scale metric is calculated using the equation $$S = \frac{y_l}{x_r \cdot \sin(\pm\theta) + y_r \cdot \cos(\pm\theta) \pm T}$$

where S is the scale metric, $y_l$ is the y co-ordinate of the feature position in the first image, $y_r$ is the y co-ordinate of the corresponding feature position in the second image, $x_r$ is the x co-ordinate of the corresponding feature position in the second image, $\pm\theta$ is a given roll between the first and second images relative to the optical axis and $\pm T$ is a given vertical translation between the corresponding feature positions relative to the optical axis.

5. A method according to claim 1, wherein the roll is calculated by:
   selecting two feature positions in the first image and a corresponding two feature positions within the second image; and determining the roll in accordance with a given scale misalignment between the first and second images.

6. A method according to claim 5, wherein the feature position in the first image and the corresponding feature position in the second image are located to the left of the defined optical axis and the at least one further feature position in the first image and the at least one further corresponding feature position in the second image are located to the right of the defined optical axis.

7. A method according to claim 6, wherein the roll misalignment is calculated using the equation $$\Delta\theta = \mathrm{Tan}^{-1}\left(\frac{R-L}{1+R\cdot L}\right)$$

where $$L = \frac{(y2_l - y1_l)}{S\cdot(x2_r - x1_r)}$$

and $$R = \frac{(y2_r - y1_r)}{(x2_r - x1_r)}$$

S is the scale misalignment between the first and second images, $y2_l$ is the y co-ordinate of the at least one further feature position in the first image, $y1_l$ is the y co-ordinate of the feature position in the first image, $y1_r$ is the y co-ordinate of the corresponding feature position in the second image, $x2_r$ is the x co-ordinate of the at least one further corresponding feature position in the second image and $x1_r$ is the x co-ordinate of the corresponding feature position in the second image.

8. A method according to claim 1 wherein the feature position and the further feature position are generated randomly.

9. A method according to claim 1 wherein the feature position is a pixel position in the respective first and second image.

10. A non-transitory computer readable medium storing a computer program containing computer readable instructions which, when loaded onto a computer, configure the computer to perform a method according to claim 1.

11. An image processing apparatus operable to determine misalignment between a first image and a second image, the first and second images being viewable stereoscopically, the apparatus comprising:
circuitry configured as:
a determiner operable to determine a feature position within the first image and a corresponding feature position within the second image;
a definer operable to define, within the first image and the second image, an optical axis of cameras capturing said respective images; and
a misalignment calculator operable to calculate the misalignment between at least one of scale, roll or vertical translation of the feature position within the first image and the corresponding feature position within the second image, the misalignment being determined in dependence upon the location of the feature position of the first image and the corresponding feature position of the second image relative to the defined optical axis of the respective images,
wherein the definer is further operable to define within the first image at least one further feature position, and at least one further corresponding feature position within the second image, wherein the vertical translation is calculated by: selecting two feature positions in the first image and a corresponding two feature positions within the second image; and determining the vertical translation in accordance with a given roll misalignment between the first and second images,
wherein the feature position in the first image and the corresponding feature position in the second image are located above the defined optical axis and the at least one further feature position in the first image and the at least one further corresponding feature position in the second image are located below the defined optical axis, and
wherein the vertical translation is determined using the equation $$T = \frac{(R_1 \cdot y2_l - R_2 \cdot y1_l)}{(y1_l + y2_l)}$$

where T is the value of the translation, $y1_l$ is the y co-ordinate of the feature position in the first image, $y2_l$ is the y co-ordinate of the at least one further feature position in the first image; and $R_1 = x1_r\cdot\sin(\theta) + y1_r\cdot\cos(\theta)$ where $x1_r$ is the x co-ordinate of the corresponding feature position in the second image, $y1_r$ is the y co-ordinate of the corresponding feature position in the second image and $R_2 = x2_r\cdot\sin(-\theta) + y2_r\cdot\cos(-\theta)$ where $x2_r$ is the x co-ordinate of the at least one further corresponding feature position in the second image, where $y2_r$ is the y co-ordinate of the at least one further corresponding feature position in the second image and θ is the given roll misalignment.

12. An apparatus according to claim 11, wherein the scale is calculated by: selecting the feature position in the first image and the corresponding feature position within the second image; and determining the scale in accordance with a given vertical translation between the first and second images.

13. An apparatus according to claim 12, wherein the feature position in the first image and the corresponding feature position in the second image is located above the defined optical axis or the feature position in the first image and the corresponding feature position in the second image is located below the defined optical axis.

14. An apparatus according to claim 13, wherein a scale metric is calculated using the equation $$S = \frac{y_l}{x_r \cdot \sin(\pm\theta) + y_r \cdot \cos(\pm\theta) \pm T}$$

where S is the scale metric, $y_l$ is the y co-ordinate of the feature position in the first image, $y_r$ is the y co-ordinate of the corresponding feature position in the second image, $x_r$ is the x co-ordinate of the corresponding feature position in the second image, ±θ is a given roll between the first and second images relative to the optical axis and ±T is a given vertical translation between the corresponding feature positions relative to the optical axis.

15. An apparatus according to claim 11, wherein the roll is calculated by: selecting two feature positions in the first image and a corresponding two feature positions within the second image; and determining the roll in accordance with a given scale misalignment between the first and second images.

16. An apparatus according to claim 15, wherein the feature position in the first image and the corresponding feature position in the second image are located to the left of the defined optical axis and the at least one further feature position in the first image and the at least one further corresponding feature position in the second image are located to the right of the defined optical axis.

17. An apparatus according to claim 16, wherein the roll misalignment is calculated using the equation $$\Delta\theta = \mathrm{Tan}^{-1}\left(\frac{R-L}{1+R\cdot L}\right)$$

where $$L = \frac{(y2_l - y1_l)}{S\cdot(x2_r - x1_r)}$$

and $$R = \frac{(y2_r - y1_r)}{(x2_r - x1_r)}$$

S is the scale misalignment between the first and second images, $y2_l$ is the y co-ordinate of the at least one further feature position in the first image, $y1_l$ is the y co-ordinate of the feature position in the first image, $y1_r$ is the y co-ordinate of the corresponding feature position in the second image, $x2_r$ is the x co-ordinate of the at least one further corresponding feature position in the second image and $x1_r$ is the x co-ordinate of the corresponding feature position in the second image.

18. An apparatus according to claim 11 wherein the feature position and the further feature position are generated randomly.

19. An apparatus according to claim 11 wherein the feature position is a pixel position in the respective first and second image.

\* \* \* \* \*